US012587410B2

(12) United States Patent
    Lengyel

(10) Patent No.:    US 12,587,410 B2
(45) Date of Patent:       Mar. 24, 2026

(54) AUTOMOTIVE COMMUNICATION SYSTEM WITH ETHERNET RING TOPOLOGY

(71) Applicant: Atieva, Inc., Newark, CA (US)

(72) Inventor: Gabor Lengyel, Half Moon Bay, CA (US)

(73) Assignee: Atieva, Inc., Newark, CA (US)

( * ) Notice:    Subject to any disclaimer, the term of this patent is extended or adjusted under 35 U.S.C. 154(b) by 71 days.

(21) Appl. No.:    18/700,146

(22) PCT Filed:    Oct. 10, 2022

(86) PCT No.:    PCT/US2022/077836
    § 371 (c)(1),
    (2) Date:    Apr. 10, 2024

(87) PCT Pub. No.:    WO2023/064722
    PCT Pub. Date: Apr. 20, 2023

(65)    Prior Publication Data
    US 2024/0422027 A1     Dec. 19, 2024

Related U.S. Application Data

(60) Provisional application No. 63/262,378, filed on Oct. 11, 2021.

(51) Int. Cl.
    *H04L 12/42*       (2006.01)
    *B60R 16/023*     (2006.01)
    (Continued)

(52) U.S. Cl.
    CPC ............ *H04L 12/42* (2013.01); *B60R 16/023* (2013.01); *H04L 12/40* (2013.01);
    (Continued)

(58) Field of Classification Search
    CPC ......... H04L 12/12; H04L 12/40; H04L 12/42; H04L 12/4641; H04L 12/4645;
    (Continued)

(56)    References Cited

U.S. PATENT DOCUMENTS 6,654,355 B1 *   11/2003   Marbach ............. H04L 12/4625
                                                          370/469
2009/0097427 A1 *   4/2009   Diab ................. H04L 12/40136
                                                          370/311

(Continued)

FOREIGN PATENT DOCUMENTS

WO        2020150872 A1      7/2020

OTHER PUBLICATIONS

International Search Report and Written Opinion for PCT Application No. PCT/US2022/077836, mailed on Jan. 18, 2023, 10 pages.

(Continued)

*Primary Examiner* — Calvin Cheung
(74) *Attorney, Agent, or Firm* — Brake Hughes Bellermann LLP

(57)    ABSTRACT

A vehicle communication system comprises: Ethernet gateways, wherein each of the Ethernet gateways (i) is designated to serve as the Ethernet gateway in addition to performing other automotive functions in a vehicle; (ii) is coupled to multiple buses for respective subsystems having electronic control units (ECUs) communicating using respective automotive bus protocols; and (iii) is configured to encapsulate within Ethernet packets received communications of the respective automotive bus protocols; Automotive Ethernet cables connecting the Ethernet gateways in a ring topology, each of the Ethernet gateways connected to two others of the Ethernet gateways that are adjacent to the Ethernet gateway; and a communication matrix in each of the Ethernet gateways, wherein each of the ECUs is specified as belonging to at least one of multiple virtual local area networks (VLANs), wherein a VLAN tag is included in each of the Ethernet packets.

10 Claims, 2 Drawing Sheets

(51) Int. Cl.
   *H04L 12/40*           (2006.01)
   *H04L 12/46*           (2006.01)
   *H04L 67/12*           (2022.01)

(52) U.S. Cl.
   CPC .......... *H04L 12/4645* (2013.01); *H04L 67/12*
      (2013.01); *H04L 2012/40273* (2013.01)

(58) Field of Classification Search
   CPC ..... H04L 49/102; H04L 49/354; H04L 67/12;
           H04L 2012/40273; B60R 16/023
   See application file for complete search history.

(56)           References Cited

U.S. PATENT DOCUMENTS

| | | | |
|---|---|---|---|
| 2014/0365067 A1* | 12/2014 | Kwon | G07C 5/0808 |
| | | | 701/31.5 |
| 2017/0054574 A1* | 2/2017 | Wu | H04L 12/4641 |
| 2018/0062988 A1* | 3/2018 | Sikaria | H04L 12/4633 |
| 2018/0131700 A1 | 5/2018 | Ando et al. | |
| 2020/0274927 A1* | 8/2020 | Richmond | H04L 67/12 |
| 2020/0344090 A1* | 10/2020 | Park | H04L 67/12 |
| 2020/0389469 A1 | 12/2020 | Litichever et al. | |
| 2020/0396180 A1* | 12/2020 | Cho | H04L 67/12 |
| 2021/0034564 A1* | 2/2021 | Li | H04L 12/40 |
| 2021/0092018 A1 | 3/2021 | Fang et al. | |
| 2021/0203526 A1* | 7/2021 | Latham | H04L 41/065 |
| 2021/0250340 A1* | 8/2021 | Green | H04L 12/40013 |
| 2021/0323503 A1* | 10/2021 | Lee | H04L 12/4625 |
| 2022/0247681 A1* | 8/2022 | Melgangolli | H04L 12/40 |

OTHER PUBLICATIONS

Extended European Search Report for European Application No. 22881932.2, mailed Jul. 9, 2025, 11 pages.

* cited by examiner

AUTOMOTIVE COMMUNICATION SYSTEM WITH ETHERNET RING TOPOLOGY

CROSS-REFERENCE TO RELATED APPLICATION

This application is a 35 U.S.C. § 371 National Phase Entry Application from PCT Application No. PCT/US2022/077836, filed on Oct. 10, 2022, entitled "AUTOMOTIVE COMMUNICATION SYSTEM WITH ETHERNET RING TOPOLOGY," and designating the U.S., which claims priority to U.S. Patent Application No. 63/262,378, filed on Oct. 11, 2021, and entitled "AUTOMOTIVE COMMUNICATION SYSTEM WITH ETHERNET RING TOPOLOGY," the disclosures of which are incorporated by reference herein in their entireties.

TECHNICAL FIELD

This document relates to an automotive communication system with an Ethernet ring topology.

BACKGROUND

The automotive industry has developed increasingly sophisticated internal vehicle systems to improve vehicles' traditional functions as well as to support new features. To provide communication between these systems, the traditional approach has been to install increasingly complex and voluminous wire harnesses in the vehicle. However, such harnesses add both weight, cost, and complexity to the vehicle.

SUMMARY

In an aspect, a vehicle communication system comprises: Ethernet gateways, wherein each of the Ethernet gateways (i) is designated to serve as the Ethernet gateway in addition to performing other automotive functions in a vehicle; (ii) is coupled to multiple buses for respective subsystems having electronic control units (ECUs) communicating using respective automotive bus protocols; and (iii) is configured to encapsulate within Ethernet packets received communications of the respective automotive bus protocols; Automotive Ethernet cables connecting the Ethernet gateways in a ring topology, each of the Ethernet gateways connected to two others of the Ethernet gateways that are adjacent to the Ethernet gateway; and a communication matrix in each of the Ethernet gateways, wherein each of the ECUs is specified as belonging to at least one of multiple virtual local area networks (VLANs), wherein a VLAN tag is included in each of the Ethernet packets.

Implementations can include any or all of the following features. Each of the ECUs is coupled to a physically nearest one of the Ethernet gateways. Each of the Ethernet gateways is configured for rerouting any of the Ethernet packets in an opposite direction of the ring topology upon an interruption. Each of the VLANs has a dedicated physical port on a corresponding one of the Ethernet gateways. One of the ECUs is a central node in a star topology that includes multiple other ones of the ECUs, and wherein the central node has more than one physical wire to one of the Ethernet gateways to accommodate the star topology. The communication matrix specifies that all of the Ethernet packets for at least one of the VLANs are routed to any of the Ethernet gateways coupled to a portion of that VLAN. At least one of the Ethernet gateways is further configured to decapsulate the received communication from the Ethernet packet and forward the communication according to an applicable one of the respective automotive bus protocols. At least one of the ECUs has at least two physical wires to one of the Ethernet gateways, and wherein the two physical wires are used for communications according to different ones of the respective automotive bus protocols. The Automotive Ethernet cables are gigabit-speed Automotive Ethernet cables. At least one of the ECUs is coupled to more than one of the Ethernet gateways.

BRIEF DESCRIPTION OF DRAWINGS

Like reference symbols in the various drawings indicate like elements.

DETAILED DESCRIPTION

Figure 1:
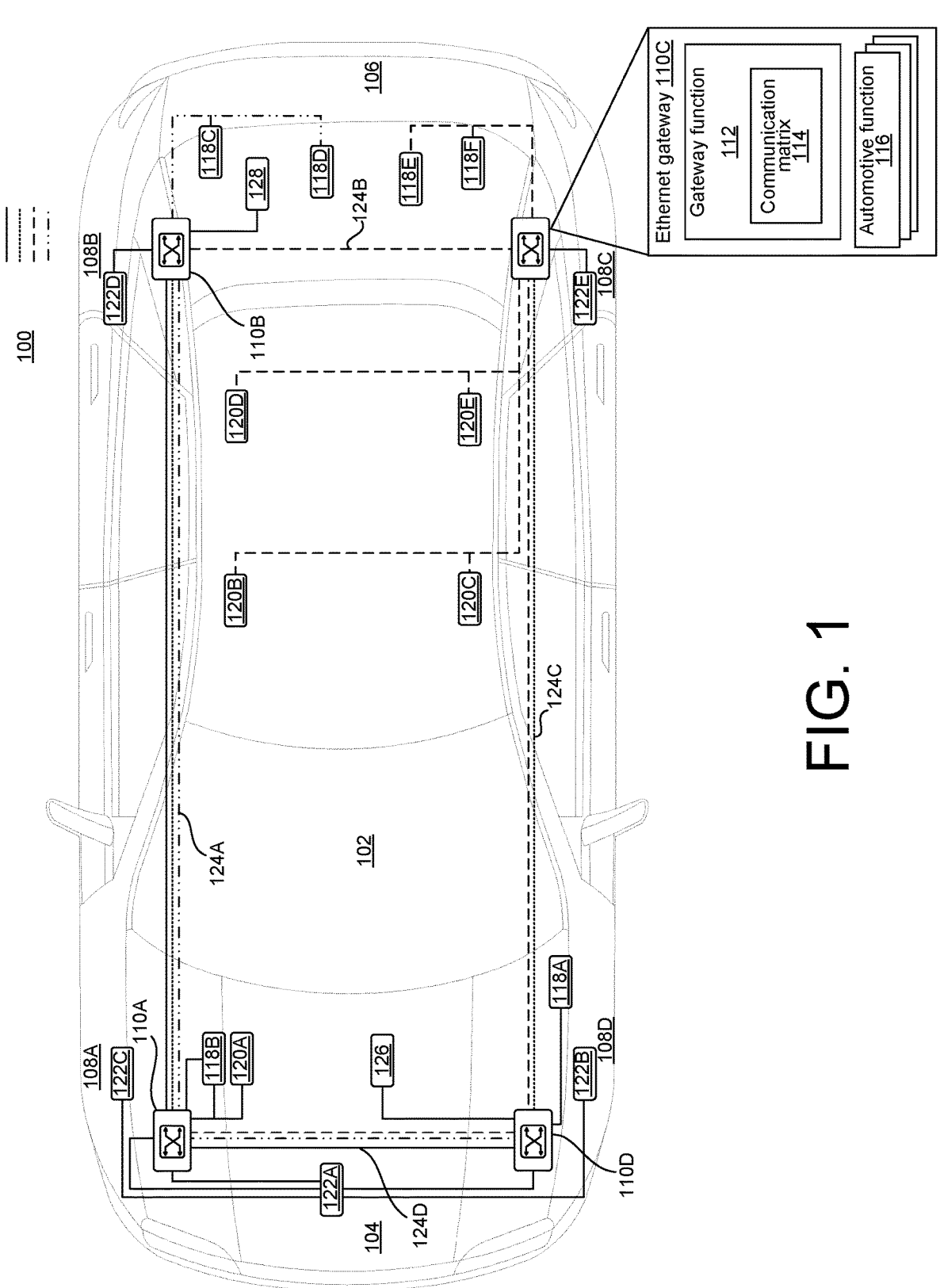
FIG. 1 shows an example of an Ethernet ring based automotive communication system.

This document describes examples of systems and techniques for providing improved communication within a vehicle using an Ethernet ring topology.

Traditionally, providing communication between systems within a vehicle would require that all components be directly wired to each other in complex patterns of conductors. To get fully connected, this typically involved having wires extending between the front and rear of the vehicle several times. While an attempted approach involved Automotive Ethernet according to a published standard, it may merely have used a few gateway components that had disparate domains defined for it, and subsystems connected thereto. The standard did not contemplate any closed configuration (e.g., a ring).

One area of vehicle technology that could benefit from additional improvement involves the challenge of how to achieve efficient wiring and communication in the car for a high number of controllers and actuators. This problem in part arises because the architecture of typical vehicles does not freely lend itself to efficient wire placement, but rather is relatively constricted. For one thing, the passenger compartment generally does not permit wires to pass through on their way, and as such the cabin is essentially a zone that is not available for cable extension. As a result, the designer of the communication system may be forced to pull wires on the periphery of the vehicle in areas that offer little flexibility and quickly become constrained.

As such, communication harnesses of modern automobiles often have a significant number of disparate wires and connectors. The harnesses may be costly to supply, require substantial amounts of labor for installation, and add significant weight to the vehicle. For certain types of vehicles, the communication harness may be about the third heaviest, and the single most expensive, of all the components in the vehicle. In an effort to reduce the size or scope of the harness that would be required, vehicle designers have sometimes chosen to move certain components, such as electronic control units (ECUs), and instead place them where they require shorter wiring. But as mentioned earlier, the available space inside a vehicle is limited, particularly for components such as ECUs that may require a cavity of a certain size. As the number of ECUs per vehicle increases, this challenge becomes more significant. While those who design communications systems may desire to provide redundant pathways as fallback solutions in case of interruption, the realization of such ambitions can run into challenges if there is already an increasing number of wires distributed throughout the vehicle.

It may also be significant where in the vehicle components are placed. Traditionally, vehicles have tended to have a greater number of their ECUs toward the front than in the rear. This includes infotainment systems, motor controllers, and battery management systems, to name just a few examples. As a result, the vehicle would have more processing power in front; the rear of the vehicle, by contrast, would be underutilized from a computing perspective. Due to the harness challenges discussed above, and other technical limitations, it was usually not practical to send automotive signals rearward for computing to be performed, and then return the result to the front where it may be needed. Many vehicles therefore tended to be equipped with more powerful ECUs in the front than in the rear.

Another limitation facing the vehicle communications designer is the number of ports that may be available for a specific purpose. A communications component such as an ECU can have a certain internal bus capacity, and may support at least one interface for communication according to an automotive bus protocol. For that component, the communications designer might then search for a gateway in the vehicle having a compatible port available and pull a wire there. However, the number of ports that are available for any of the automotive bus protocols will be limited, and can vary depending on the region of the vehicle. As such, with the number of ECUs increasing, the demands for those interfaces will also increase. A related concern is the available bandwidth: Traditional automotive communications components are limited in bandwidth, thereby throttling the utility of adding ever more ECUs to the same set of physical wires.

The present disclosure describes approaches that address the above concerns and/or provide other advantages. Ethernet gateways can be distributed within a vehicle (e.g., at least near its four corner regions), and connected to each other with Automotive Ethernet into a physical ring topology.

Such approaches are undertaken with a careful view toward the existing ECU systems that are expected to be included, because such systems were typically designed for a different kind of architecture. For example, one cannot simply assume that every third-party system (e.g., an ECU, or a particular set of ECUs) will be dynamic enough that it can be broken up into its constituent parts, and that the system will recognize that Ethernet communication is introduced in the middle. Rather, Ethernet configuration is interjected in a way that the ECUs for the most part simply are not aware that there is Ethernet communication in between the ECUs. The Ethernet configuration must be transparent to those already existing systems of ECUs that are designed to have star-like topologies. For example, one can connect the wires as if there would be physical ECUs on the end of every leg of a star topology. Such an approach can allow the central node to act in a normal fashion despite being installed in a topology for which it may not have been intended. Encapsulation and decapsulation of messages can facilitate such operation.

The present subject matter can provide flexibility to move functions freely around the vehicle. This can provide the advantage that one need not have a concentrated function on one ECU and then, in a star-like topology, pull physical wires out toward constituent components. Rather, a significantly easier distribution logic, and more favorable computational load distribution, can be obtained using a ring topology. For example, instead of pulling various physical wires to remote locations where signaling is needed, ECUs can be connected to the physically closest Ethernet gateway, whichever automotive bus protocol the communication involves. Then, with the use of a virtual local area network (VLAN), one can provide virtual connectivity instead of physical connectivity between segments of these subsystems.

In some implementations, essentially the same kind of ECU can be used in the Ethernet gateways located in the front of the vehicle as in the rear. For example, this can allow use of logic on the rear Ethernet gateways that would perhaps have resided up front according to a traditional architecture. This can allow for a better distribution of the computational loads for a number of automotive functions.

Implementations can provide one or more advantages over existing systems. Such advantages can include, but are not limited to, the following. A more logical distribution of computing power within a vehicle can be provided. For example, this can help improve or optimize the resource utilization with regard to ECUs. A lighter and less complex wire harness for a vehicle can be provided. The flexibility in physical ECU placement can be increased. Connectivity and bandwidth availability can be improved by use of a physically nearest Ethernet gateway. Communication redundancy can be inherent in a ring topology that supports bidirectional signaling.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An electric vehicle can be powered exclusively by electricity, or can use one or more other energy sources in addition to electricity, to name just a few examples.

FIG. 1 shows an example of an Ethernet ring based automotive communication system 100. The automotive communication system 100 can be used with one or more other examples described elsewhere herein. The automotive communication system 100 can be implemented in one or more types of vehicle, and is here schematically illustrated superimposed from above on a vehicle 102. The vehicle 102 has a front 104 and a rear 106, and four wheels 108A-108D. Between the front 104 and the rear 106, the vehicle 102 can have a passenger compartment to accommodate one or more persons.

The automotive communication system 100 includes Ethernet gateways 110A-110D, each of which operates based on one or more processors. The Ethernet gateway 110C is here shown in an enlarged view to exemplify components of the Ethernet gateways 110A-110D. The Ethernet gateway 110C includes gateway function component 112. In some implementations, the gateway function component 112 includes a combination of software and hardware. The gateway function component 112 can designate the Ethernet gateway 110C to serve as, and configure the Ethernet gateway 110C to be, a gateway in an Ethernet network. For example, the Ethernet gateway 110C performs encapsulation and decapsulation of non-Ethernet messages into Ethernet packets; reads VLAN tags, and labels messages with them; and routs Ethernet packets according to a communication matrix 114. The terms packet and frame are used synonymously herein.

The communication matrix 114 can serve as a configuration record that defines signaling paths in the automotive communication system 100. For example, the automotive communication system 100 can have a large number of different signals defined with regard to ECUs and other components; the communication matrix 114 can define the routing and delivery specifications regarding such messages regardless of their origin or ultimate destination within the communication system 100. As such, the communication matrix 114 can serve as a single-system definition that includes all routing information for the Ethernet gateways 110A-110D.

The Ethernet gateway 110C includes one or more automotive function components 116. The automotive function component 116 can include a combination of software and hardware, and signifies that the Ethernet gateway 110C serves in at least one capacity in addition to its role as a gateway in the Ethernet. Such additional functionality is here referred to as being automotive, and can include any of the many different roles served by ECUs in vehicles. Examples of components or systems that can be controlled by one or more ECUs include, but are not limited to, an engine or other motor (e.g., the inverter of an electric motor); a battery pack or battery modules of an electric vehicle; a thermal system; an advanced driver-assistance system (ADAS) or sensors thereof; or a vehicle infotainment system (e.g., for navigation). For example, any of the Ethernet gateways 110A-110D can be designated as a vehicle control unit (e.g., responsible for controlling the powertrain domain). As another example, another of the Ethernet gateways 110A-110D can be designated as a vehicle body controller (e.g., responsible for controlling security, access functionality, comfort features, and lights).

In addition to the Ethernet gateways 110A-110D, the automotive communication system 100 includes other ECUs that are not designated as Ethernet gateways. The automotive communication system 100 includes ECUs 118A-118F that may communicate using a particular automotive bus protocol. Other ECUs of the automotive communication system 100 can also or instead communicate using at least one other automotive bus protocol. Examples of automotive bus protocols include, but are not limited to, Local Interconnect Network (LIN), Controller Area Network (CAN), and CAN Flexible Data-Rate (CAN-FD). For example, the ECUs 118A-118F can be configured to communicate using at least a first automotive bus protocol (e.g., the LIN protocol). The ECUs 118A-118F can be considered a VLAN in the automotive communication system 100 for routing purposes so that signals relevant to one or more of these ECUs can be addressed to some or all of them. Here, the ECU 118A is coupled to the Ethernet gateway 110D by a physical wire; the ECU 118B is coupled to the Ethernet gateway 110A by a physical wire; the ECUs 118C-118D are coupled to the Ethernet gateway 110B by a physical wire; and the ECUs 118E-118F are coupled to the Ethernet gateway 110C by a physical wire.

The automotive communication system 100 includes ECUs 120A-120E that are configured to communicate using at least a second automotive bus protocol (e.g., the CAN protocol). Here, the ECU 120A is coupled to the Ethernet gateway 110A by a physical wire, and the ECUs 120B-120C and 120D-120E are coupled to the Ethernet gateway 110C by respective physical wires. The bus segments can be connected via VLAN.

In some implementations, the ECU 118B can be configured for both the first and second automotive bus protocols (e.g., LIN and CAN). As such, the ECU 118B can be coupled to the Ethernet gateway 110A also by another physical wire, separate from the wire used for communications according to the first automotive bus protocol. The wires can connect to separate physical interfaces of the Ethernet gateway 110A.

The automotive communication system 100 includes ECUs 122A-122E that are configured to communicate using at least a third automotive bus protocol (e.g., the CAN-FD protocol). Here, the ECU 122A is coupled to the Ethernet gateway 110A by two physical wires, and is coupled to the ECUs 122B-122C by respective physical wires. The ECU 122D is coupled to the Ethernet gateway 110B by a physical wire, and the ECU 122E is coupled to the Ethernet gateway 110C by a physical wire.

As such, each of the Ethernet gateways 110A-110D connects multiple different buses together, and can rout traffic from one bus to another, or to another of the Ethernet gateways 110A-110D, based on signal definitions in the communication matrix 114.

Communications from one of the Ethernet gateways 110A-110D to another are done by way of Ethernet cables. In some implementations, cables that conform to the Automotive Ethernet standard can be used. A cable speed rating can be any of multiple different options. For example, speeds on the order of about multiple megabits per second can be used. As another example, speeds on the order of about one or more gigabits per second can be used. In some implementations, the cable can be a twisted pair of physical wires. For example, shielded or unshielded cable can be used.

The automotive communication system 100 connects the Ethernet gateways 110A-110D in a ring topology using the Ethernet cables. In some implementations, the Ethernet gateway 110A is connected to the Ethernet gateways 110D and 110B; the Ethernet gateway 110B is connected to the Ethernet gateways 110A and 110C; the Ethernet gateway 110C is connected to the Ethernet gateways 110B and 110D; and the Ethernet gateway 110D is connected to the Ethernet gateways 110C and 110A. As such, each of the Ethernet gateways 110A-110D can be connected to two others of the Ethernet gateways 110A-110D that are adjacent to the Ethernet gateway. Here, an Automotive Ethernet cable 124A connects the Ethernet gateways 110A and 110B with each other; an Automotive Ethernet cable 124B connects the Ethernet gateways 110B and 110C with each other; an Automotive Ethernet cable 124C connects the Ethernet gateways 110C and 110D with each other; and an Automotive Ethernet cable 124D connects the Ethernet gateways 110D and 110A with each other. An Automotive Ethernet cable can communicate Ethernet encapsulated CAN, CAN-FD, and LIN frames.

The ring topology allows the automotive communication system 100 to route packets in any or both directions about the ring. Such route path can be, but is not necessarily, the physically shortest distance between any two of the Ethernet gateways 110A-110D. The communication matrix 114 can define many different paths through the automotive communication system 100 for messages of any of the automotive bus protocols.

The following is an example involving the ECUs 118A-118F, which can be referred to as a LIN based subsystem. Without the ring topology of the automotive communication system 100, all of the ECUs 118A-118F would need to be connected by respective physical wires left and right depending on where they are in the vehicle 102. Instead, the ECU 118A is connected to the Ethernet gateway 110D which is the physically nearest one of the Ethernet gateways 110A-110D. Similarly, the ECU 118B is connected to its physically nearest gateway, which is the Ethernet gateway 110A; the ECUs 118C-118D to the Ethernet gateway 110C; and the ECUs 118E-118F to the Ethernet gateway 110C. That is, the ECUs 118A-118F are distributed into four semi-disconnected segments of the LIN-based domain. The Ethernet gateways 110A-110D can be configured (e.g., by the communication matrix 114) so that any communication that comes in on any physical wire from the LIN domain will be mapped to one or more VLANs. Such mapping can be the basis for routing through one or more of the Automotive Ethernet cables 124A-124D.

For example, the ECU 118A can use a standard LIN transceiver to generate a LIN message that reaches the Ethernet gateway 110D. The Ethernet gateway 110D can encapsulate the LIN message within an Ethernet packet, label the packet with a VLAN tag, and forward the tagged packet toward the Ethernet gateway 110A. The Ethernet gateway 110A, in turn, may or may not alter the received Ethernet packet but will forward a communication to one or more recipients. For example, the Ethernet gateway 110A forwards the packet to the Ethernet gateway 110B according to the communication matrix 114. The Ethernet gateway 110B can exit the traffic to the physical wire of the ECUs 118C-118D (including decapsulation into a LIN message), and/or forward the packet to the Ethernet gateway 110C for decapsulation and forwarding to the ECUs 118E-118F. For example, the LIN message from the ECU 118A can be delivered to all other ECUs in the same VLAN, here the ECUs 118B-118F. As another example, the LIN message from the ECU 118A can be delivered to only one or more of the ECUs 118B-118F. As another example, the LIN message from the ECU 118A can be delivered to another VLAN. Combinations of these approaches can be used.

That is, the automotive communication system 100 can make use of both virtual and physical addresses, and/or both virtual interfaces and physical interfaces. The operation of the automotive communication system 100 is based on how addresses are mapped in the configuration of the Ethernet gateways 110A-110D. For example, with the ECUs 118A-118F there is a physical interface that goes into the Ethernet gateway 110D. That interface has a specific number, and can be referred to as a dedicated LIN transceiver. Software associated with that transceiver is configured for handling the communications protocol of that section. Then logic can be applied to encapsulate, tag, and then forward that LIN traffic around one or more VLANs. The VLANs can be considered a logical addressing in that there is no physical wiring or port associated with each VLAN; rather, the VLAN is a tag in the Ethernet frame. Such tag identifies for the rest of the system which VLAN that frame belongs to. As such, no hardware preset wiring is used.

The ECU 122A can be considered a central node of a star topology (sometimes referred to as a star-like topology) that also includes other nodes, here the ECUs 122B-122E. For example, the ECU 122A can correspond to a suspension controller, and the ECUs 122B-122E can be the active suspension units for the wheels 108A-108D, respectively. If traditional wiring not based on the present disclosure were used, respective physical wires would extend from the ECU 122A to each of the ECUs 122B-122E, and those wires would be dedicated to that domain only. The central node has physical interfaces (e.g., receptacles for connectors) that are associated with those other nodes. As such, the operation of the ECU 122A can be based on successfully engaging in communication with the ECUs 122B-122E at the respective physical wires of those interfaces.

Here, the ECU 122A has physical wires connected to the ECUs 122B-122C. However, the other physical wires from the ECU 122A are connected to the Ethernet gateways 110A and 110D. The Ethernet gateway 110A has the Automotive Ethernet cable 124A connecting to the Ethernet gateway 110B, which has a physical wire to the ECU 122D. Similarly, the Ethernet gateway 110D has the Automotive Ethernet cable 124C connecting to the Ethernet gateway 110C, which has a physical wire to the ECU 122E. As such, the original star topology of the ECUs 122A-122E can be accommodated by allowing the ECU 122A to couple more than one physical wire to any one of the Ethernet gateways 110A-110D, and/or by allowing the ECU 122A to couple respective physical wires to two or more of the Ethernet gateways 110A-110D.

An ECU 126 is connected to the Ethernet gateway 110D, and an ECU 128 is connected to the Ethernet gateway 110B. ECUs 126 and 128 can signal according to another communication protocol than one or more of the ECUs mentioned in previous examples. In some implementations, the ECUs 126 and 128 can use the same protocol as each other, or different protocols. For example, the ECUs 126 and/or 128 can communicate by way of Ethernet packets.

Figure 2:
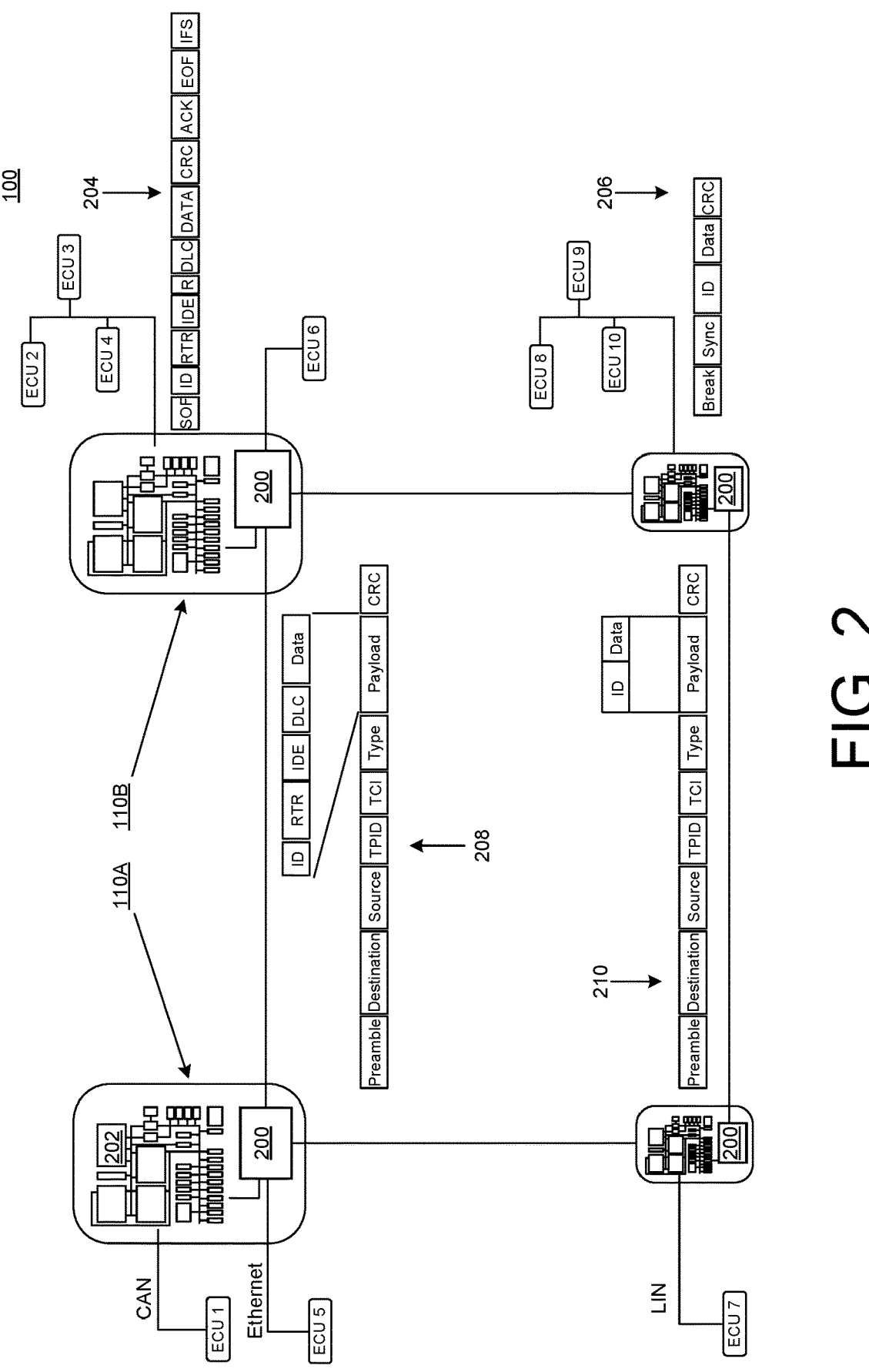
FIG. 2 shows an example of encapsulating a received communication of an automotive bus protocol in an Ethernet packet.

FIG. 2 shows an example of encapsulating a received communication of an automotive bus protocol in an Ethernet packet. In this example, the automotive communication system 100 includes the Ethernet gateways 110A-110D, and multiple ECUs as indicated. In some implementations, each of the Ethernet gateways 110A-110D can include a corresponding Ethernet switch 200. For example, the Ethernet switch 200 corresponds to the gateway function component 112 (FIG. 1). Each of the Ethernet gateways 110A-110D can include a corresponding processor 202.

Encapsulation and decapsulation can be applied to messages according to any of multiple different automotive bus protocols. Here, a CAN frame 204 and a LIN frame 206 are used as examples. The CAN frame 204 may include, from left to right, a start of frame (SOF) field; an identifier (ID) field; a remote transmission request (RTR) field; an identifier extension bit (IDE) field; a reserved bit (R) field; a data length code (DLC) field; a data (DATA) field; a cyclic redundancy check (CRC) field; an acknowledgement (ACK) field; an end-of-frame (EOF) field; and an inter-frame spacing (IFS) field. The DATA field, which contains the substance of the CAN communication, should be maintained in processing of the CAN frame 204, whereas one or more of the other fields can be omitted or combined into other information during encapsulation.

Here, any of the Ethernet gateways 110A-110D that receives the CAN frame 204 (e.g., from a VLAN having CAN-based ECUs) can encapsulate the CAN frame 204 within an Ethernet frame 208. The Ethernet frame 208 may include, from left to right, a preamble field; a destination field; a source field; a tag protocol identifier (TPID) field; a tag control information (TCI) field; a type field; a payload field; and a CRC field. Some or all of the CAN frame 204 can be encapsulated within the payload field. Here, the ID, RTR, IDE, DLC, and DATA fields of the CAN frame 204 are shown to be included in the payload field of the Ethernet frame 208. A tag that identifies a VLAN related to CAN messaging may be included in the TCI field.

The one of the Ethernet gateways 110A-110D that encapsulates the CAN frame 204 can then forward the Ethernet frame 208 to another of the Ethernet gateways 110A-110D. That recipient can then in turn forward the Ethernet frame 208 to another recipient, and/or can decapsulate the Ethernet frame 208 and restore a version of the CAN frame 204 that at least contains the information corresponding to the ID, RTR, IDE, DLC, and DATA fields of the CAN frame 204.

Turning now to the LIN frame 206, it may include, from left to right, a break field; a synchronization (Sync) field; an ID field; a data field; and a CRC field. The data field, which contains the substance of the LIN communication, should be maintained in processing of the LIN frame 206, whereas one or more of the other fields can be omitted or combined into other information during encapsulation.

Here, any of the Ethernet gateways 110A-110D that receives the LIN frame 206 (e.g., from a VLAN having LIN-based ECUs) can encapsulate the LIN frame 206 within an Ethernet frame 210. The Ethernet frame 210 may include, from left to right, a preamble field; a destination field; a source field; a TPID field; a TCI field; a type field; a payload field; and a CRC field. Some or all of the LIN frame 206 can be encapsulated within the payload field. Here, the ID and data fields of the LIN frame 206 are shown to be included in the payload field of the Ethernet frame 210. A tag that identifies a VLAN related to LIN messaging can be included in the TCI field.

The one of the Ethernet gateways 110A-110D that encapsulates the LIN frame 206 can then forward the Ethernet frame 210 to another of the Ethernet gateways 110A-110D. That recipient can then in turn forward the Ethernet frame 210 to another recipient, and/or can decapsulate the Ethernet frame 210 and restore a version of the LIN frame 206 that at least contains the information corresponding to the ID and data fields of the LIN frame 206.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle communication system comprising:
Ethernet gateways, wherein each of the Ethernet gateways (i) is designated to serve as the Ethernet gateway in addition to performing other automotive functions in a vehicle; (ii) is coupled to multiple buses for respective subsystems having electronic control units (ECUs) communicating using respective automotive bus protocols; and (iii) is configured to encapsulate within Ethernet packets received communications of the respective automotive bus protocols;
Automotive Ethernet cables connecting the Ethernet gateways in a ring topology, each of the Ethernet gateways connected to two others of the Ethernet gateways that are adjacent to the Ethernet gateway; and
a communication matrix in each of the Ethernet gateways, wherein each of the ECUs is specified as belonging to at least one of multiple virtual local area networks (VLANs), wherein a VLAN tag is included in each of the Ethernet packets.

2. The vehicle communication system of claim 1, wherein each of the ECUs is coupled to a physically nearest one of the Ethernet gateways.

3. The vehicle communication system of claim 1, wherein each of the Ethernet gateways is configured for rerouting any of the Ethernet packets in an opposite direction of the ring topology upon an interruption.

4. The vehicle communication system of claim 1, wherein each of the VLANs has a dedicated physical port on a corresponding one of the Ethernet gateways.

5. The vehicle communication system of claim 1, wherein one of the ECUs is a central node in a star topology that includes multiple other ones of the ECUs, and wherein the central node has more than one physical wire to one of the Ethernet gateways to accommodate the star topology.

6. The vehicle communication system of claim 1, wherein the communication matrix specifies that all of the Ethernet packets for at least one of the VLANs are routed to any of the Ethernet gateways coupled to a portion of that VLAN.

7. The vehicle communication system of claim 1, wherein at least one of the Ethernet gateways is further configured to decapsulate the received communication from the Ethernet packet and forward the communication according to an applicable one of the respective automotive bus protocols.

8. The vehicle communication system of claim 1, wherein at least one of the ECUs has at least two physical wires to one of the Ethernet gateways, and wherein the two physical wires are used for communications according to different ones of the respective automotive bus protocols.

9. The vehicle communication system of claim 1, wherein the Automotive Ethernet cables are gigabit-speed Automotive Ethernet cables.

10. The vehicle communication system of claim 1, wherein at least one of the ECUs is coupled to more than one of the Ethernet gateways.

* * * * *